United States Patent [19]

Gibbs

[11] Patent Number: 5,146,655
[45] Date of Patent: Sep. 15, 1992

[54] SAFETY CLAMP APPLIANCE

[76] Inventor: Peter E. Gibbs, 2608 E. 3830 South, Salt Lake City, Utah 84109

[21] Appl. No.: 783,914

[22] Filed: Oct. 29, 1991

[51] Int. Cl.⁵ .................. A44B 21/00; F16G 11/00
[52] U.S. Cl. .................. 24/134 R; 24/132 WL; 24/135 K; 188/65.2
[58] Field of Search .......... 24/134 R, 134 KB, 136 L, 24/132 R, 132 AA, 132 WL, 135 K; 188/65.2, 65.3

[56] References Cited

U.S. PATENT DOCUMENTS

| | | | |
|---|---|---|---|
| 1,244,043 | 10/1917 | Euler | 24/135 K |
| 1,372,853 | 3/1921 | Wellen | 188/65.2 |
| 1,961,081 | 5/1934 | Schrader | 188/65.2 |
| 2,775,422 | 12/1956 | von Herbulis et al. | 24/135 K |
| 3,179,994 | 4/1965 | Meyer et al. | 24/134 R |
| 3,674,116 | 7/1972 | Vogeli | 188/65.2 |
| 3,852,943 | 12/1974 | Healy | 24/134 R |
| 3,876,036 | 4/1975 | Sweet | 188/65.2 |
| 4,253,218 | 3/1981 | Gibbs | 24/134 R |
| 4,657,110 | 4/1987 | Wolner | 188/65.2 |

*Primary Examiner*—Victor N. Sakran
*Attorney, Agent, or Firm*—John B. Dickman, III

[57] ABSTRACT

A safety clamp appliance is disclosed formed of a cable or rope housing having opposed hinged walls for opening to receive a rope and a generally U-shaped cross-section, the housing interior being adapted with a rope slide to receive a safety rope, a brake lever having a pivot point, a brake surface and a handle for attachment to a climber's belt. The brake lever is pivotally mounted in the housing. An actuating spring is provided for spring loading the brake lever, thereby maintaining a constant pressure by the brake surface on the rope. The actuating spring is provided with a quick release fastener to disconnect from the brake lever for converting the safety clamp appliance from a spring loaded mode to a non-spring loaded mode.

9 Claims, 2 Drawing Sheets

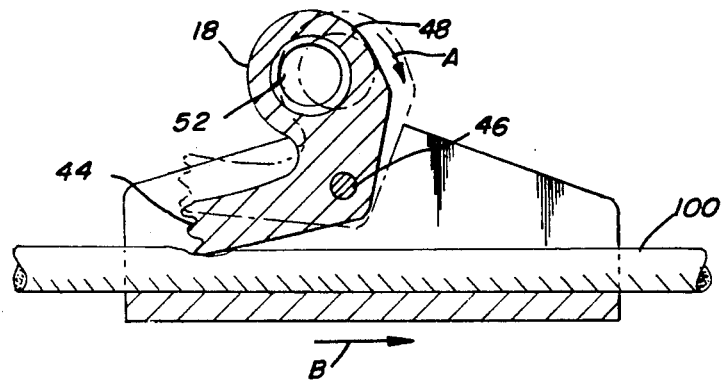
FIG. 5
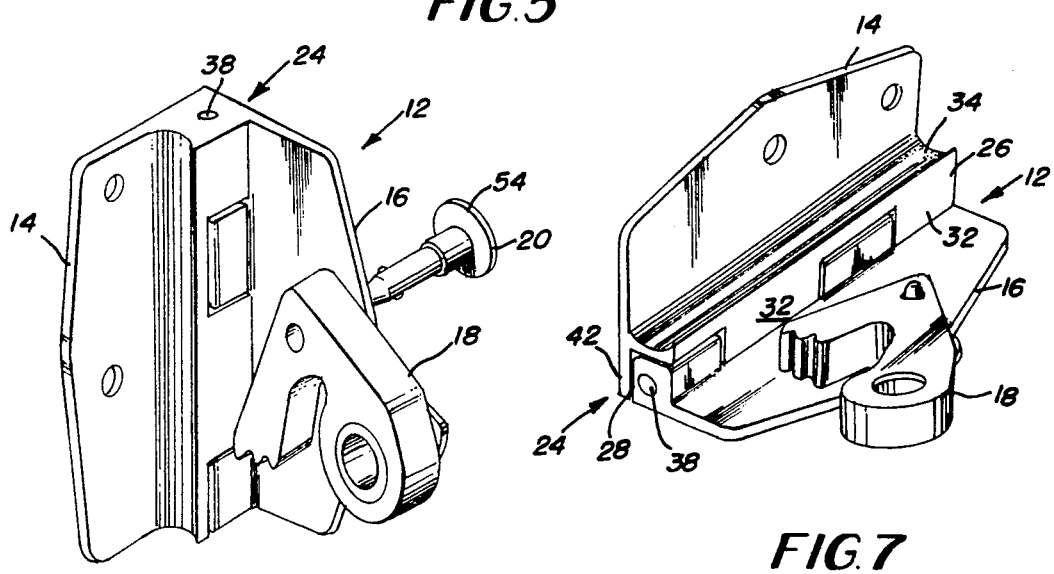
FIG. 6
FIG. 7
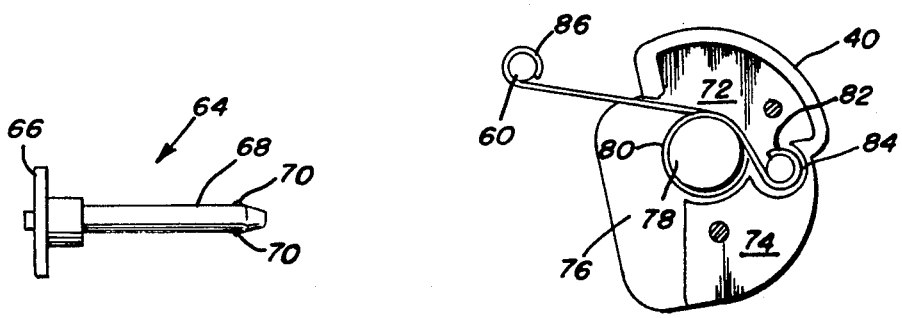
FIG. 8
FIG. 9

SAFETY CLAMP APPLIANCE

BACKGROUND OF THE INVENTION

This invention relates to an improvement of my U.S. Pat. No. 4,253,218, titled SPRING LOADED ASCENDER, directed to a safety appliance releasable attachable to an upright safety cable and adapted to clamp upon a cable to prevent falling of a workman climbing an elevated structure, rock and mountain climbers, firemen and the like. The improvement provides a hinged ascender housing for easy loading a rope or cable and a spring assembly for quick release to convert from spring loaded to free running.

Since the developement and patenting of my Spring Loaded Ascender, it has been realized that loading of a rope or cable between the ascender housing and brake lever was awkward and time consuming. The results of the loading could be critical since at this point in time the user has no safety line to prevent falling. Therefore, it is important to reduce the loading time and to provide a simple to use loading system. In a work environment where workmen or other persons are climbing an elevated structure and making several connections and disconnections of safety clamp appliances, time and ease of assembly are critical to their safety. Heretofore there has not been an ascender that provided such safety to the user.

There are also occasions where a safety clamp appliance needs to be spring loaded in order to maintain constant gripping of the safety cable as in the case of industrial workers. Other occasions require a safety clamp appliance which is easily slidable along the safety cable and, therefore, the safety clamp appliance should not be spring loaded. (Such occasions occur in mountain climbing and cave exploration). The prior art safety clamp appliances are either spring loaded or not spring loaded. There is no one single appliance that can be both spring loaded or not spring loaded, except for U.S. Pat. No. 4,253,218, issued to the present inventor. The differences between the present invention and my issued patent are the housing, the mount for the spring, and the spring. In the patent, a first coil spring is fastened to the brake lever 30 and to a keeper ring, a second spring extends from the keeper ring to a fixed place on the housing. The keeper ring holds the spring under tension by hooking on a post on the housing. In order to use the appliance without spring loading, the keeper ring is removed from the post to remove the tension on the brake.

U.S. Pat. No. 4,253,218, lists prior art patents which are spring loaded. These patents show the use of torsion springs that are fixed to the appliances in such a way that they are not easily removed. An improved single clamp appliance which may be used in a spring loaded mode or a non-spring loaded mode by removing a pin would be very useful in industrial applications and in mountain climbing or cave exploration, particularly in terms of savings in time and money.

One other prior art U.S. Pat. No. is 1,244,043, to Euler.

SUMMARY OF THE INVENTION

The present invention is an improvement of issued U.S. Pat. No. 4,253,218, to the same inventor, which provides a rugged and reliable safety clamp appliance for connecting a workman or a climber to an upstanding safety cable or rope. Briefly the improvement includes an elongated housing having opposed walls and a generally U-shaped cross section. The housing interior has been adapted to longitudinally receive a safety rope. The rope is inserted in the housing by pivoting one of the opposed walls to open the housing, thereby exposing the interior. A removable pivot pin is provided to fasten a brake lever to the pivot pin and to secure the opposed walls of the housing together. The brake lever has an intermediate pivot point and a brake surface on one end and a handle at the other end for attachment to a workman's safety belt. The brake lever pivots into and out of engagement with a cable or rope in the housing as the handle is moved downwardly or upwardly. An actuating spring is detachably attached to the handle end of the brake lever and permanently connected to the mounting assembly fixed to the housing.

It is a primary object of the invention to provide an improved clamping safety appliance which is inexpensive to manufacture that will replace existing clamping appliances which are designed to quickly open and receive a rope.

It is a further object of the improved clamping safety appliance to provide separable components readily and easily applicable to and removable from a safety cable and having a spring detachably attached to a brake lever to quickly provide a spring loading or non-spring loading of the brake lever.

BRIEF DESCRIPTION OF THE DRAWINGS

FIG. 5 is a cross-sectional view of the improved safety clamp appliance of the invention taked along the line 4—4 of FIG. 2.

FIG. 6 is a perspective view of the improved safety clamp appliance showing the housing open to receive a safety rope.

FIG. 7 another perspective view of the improved safety clamp appliance showing the housing open and the hinge of the invention.

FIG. 8 shows a locking pin of the invention.

FIG. 9 shows a side view of a spring assembly of the present invention.

DETAILED DESCRIPTION OF THE PREFERRED EMBODIMENT OF THE INVENTION

Figure 1:
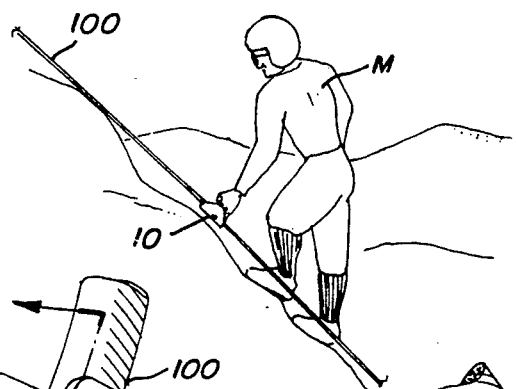
FIG. 1 is a view of a mountain climber using the improved appliance of this invention.
Figure 2:
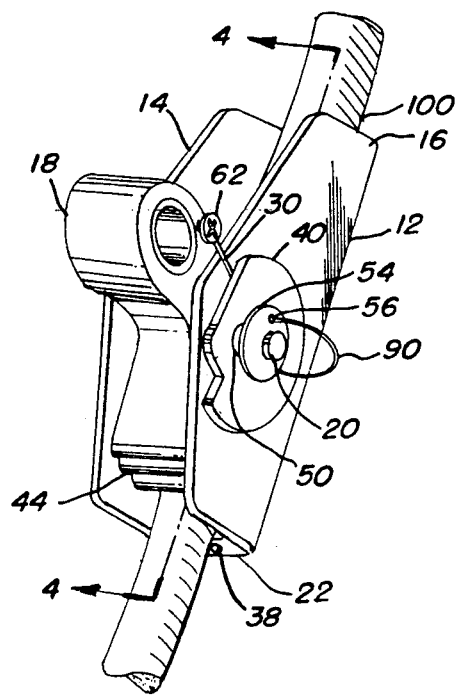
FIG. 2 is a perspective view of the improved safety clamp appliance of this invention.

Referring to FIG. 1, there is shown a safety clamp appliance 10 movably attached to a safety cable or rope 100. The safety cable or rope 100 hereinafter will be referred to as rope 100. A climber M is shown using the safety clamp appliance 10 and a rope to ascend a mountain.

Figure 3:
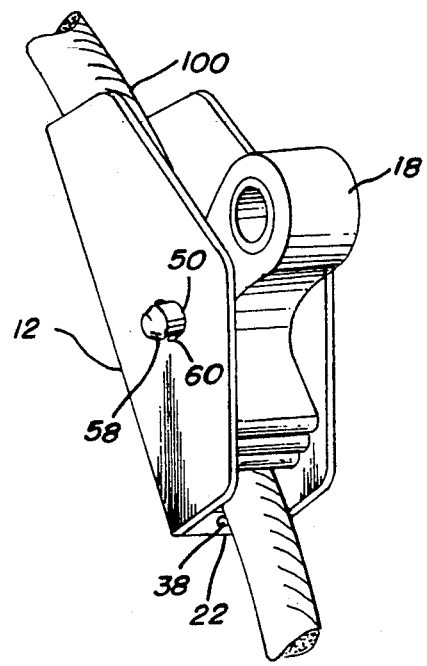
FIG. 3 is another perspective view of the improved safety clamp a of this invention.

The safety clamp appliance 10 is more clearly shown in FIGS. 2 through 9 which includes a housing 12 and a brake lever 18 connected to one another by a pivot pin 20. In FIG. 3, an actuating spring 30 is connected to the brake lever 18 and to the housing 12 by a spring mounting assembly 40 which maintains the brake lever 18 in constant contact with the rope 100. The spring mounting assembly 40 is provided with cavities to receive the spring 30 and hold it against unwanted movement. There is also a safety chain 90 which fastens to the housing 12 and to the pivot pin 20 to prevent the pivot pin 20 from being separated from the safety clamp appliance 10.

Figure 4:
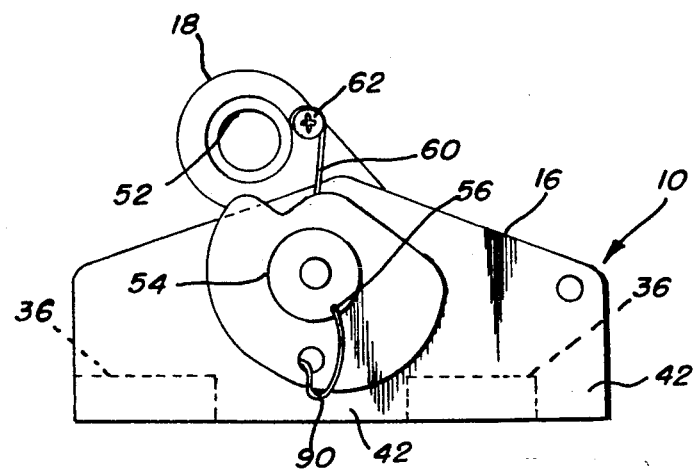
FIG. 4 is a side view of the improved safety clamp appliance of this invention.

The housing 12 is formed from cast metal providing a pair of side walls 14 and 16 hinged together to form a rear wall 22 with a generally U-shaped cross-section. The interior of the housing 12 is best shown in FIGS. 6 and 7 where a hinge structure 24 is formed of two halves 26 and 28, respectively, integrally cast with side walls 14 and 16. Hinge half 26 is cast with one surface of the pivot loops or knuckles 32 forming a rope slide 34 which has a concaved arcuate surface perpendicular to the interior of wall 14 and interior of the housing. There are two knuckles 32 on side wall 14 and two knuckles 36 on side wall 16, both sets of knuckles project perpendicular to the side walls 14 and 16 such that when connected together by a hinge pin 38, the hinge structure forms rear wall 24. Each side wall 14 and 16, respectively has a skirt or stop area 42 to limit the pivoting of the housing walls to open to a ninety degree angle as shown in FIG. 4. By limiting the walls 14 and 16 to open at right angles to one another, the time to open and insert a safety rope 100 is better controlled.

The brake lever 18 is provided with a brake surface 44 at one end and a pivot point intermediate its length in the form of an orifice 46 shown in FIG. 5. The outer rope contacting surface 44 may be roughened by transverse ridges or knuckles to promote slip-free contact with the rope 100 and is electric with respect to the orifice 46 so that the surface swings inwardly to contact the rope 100 while the other end, or handle, 48 of the brake lever swings outwardly. The orifice 46 is aligned between a pair of aligned apertures 50 formed in each of the side walls 14 and 16 for receiving and holding the pivot pin 20. To keep the rope trapped and to reduce the lateral "play" between the sides of brake lever 18 and the inner surfaces of the side walls 14 and 16, the thickness of the brake lever 18 and the width of the space between the side walls 14 and 16 are about the same. It may be desirable to reduce the thickness of the brake lever 18 at the handle end 48. The handle end 48 has an aperture 52 through which a connecting ring of the like may be passed for attaching the brake lever to the safety belt of a workman or climber.

The brake lever 30 is pivotally mounted to the housing 12 by pivot pin 20 which passes through the first bearing aperture 50 of housing side wall 16, thence through the orifice 46 of the brake lever 18 and through the bearing aperture 50 of housing side wall 14. The pivot pin 20 is provided at the end with a head 54 with an aperture 56 for attaching the safety chain or cable 90 to the housing 13. The free end 58 of a pivot pin 20 is tapered to aid in assembling the brake lever and pivot pin 20 to the housing side wall 14 to prevent removal of the pivot pin. When the pivot pin 20 is to be removed, pressure is applied to end 58 which forces the detent 60 to retract thereby allowing the pivot pin to slip through apertures 50 and orifices 46.

The brake lever 18 may be held in gripping engagement with rope 100 using actuating lever spring 30. Brake lever 18 pivots on pivot pin 20 to grip rope 100 as shown in FIG. 5 when actuating spring 30 is connected to spring mounting assembly 40 on housing side wall 16. The actuating spring 30 is attached to the handle end 48 of the brake lever 30 by a fastener 62 such as a screw or a quick release pin 64 as shown in FIG. 8. The quick release pin 64 generally functions like pivot pin 20 in that there is a head end 66 and a free end 68 with detents 70. Brake lever 18 would have an aperture, not shown, which the free end 68 passes through to secure the actuating spring 30 to the brake lever 18. The fastener 62 can be removed to unload the spring, making the rope free running.

Spring mounting assembly 40, shown in FIG. 9 for use on housing side wall 16 for left handed workmen, the mounting assembly 40 in FIG. 4 will have similar structure, but opposite to the one shown in FIG. 9 which includes a cavity 72 and surrounding walls 74. One end of the mounting assembly 40 has an open area 76 to allow actuating spring 30 to reciprocate freely. The mounting assembly 40 has an orifice 78 which the pivoting pin 20 passes through to lock the housing side walls 14 and 16 together. The actuating spring 30 is held in the mounting assembly 40 by a coil 80 in the spring that circles orifice 78, which the pivot pin passes through, to provide a pivot point for the actuating spring 30 and a coil end 82 that is held in a cavity area 84 against movement. The other end 86 of the actuating spring 30 is also coiled so that a fastener 62 or 64 can fasten the spring to brake ever 18.

When the safety clamp appliance 10 is to be used for climbing, it is sometimes necessary to have the brake lever 18 in a non-spring loaded mode. This is because in ascending a safety rope, mountain climbers and cavers do not like the increased drag associated with spring loaded clamps. Spring loaded clamps are desirable for rescue, pack hauling and operations other than climbing. With the safety appliance 10 of this invention it is a simple matter to convert from spring loaded to non-spring loaded by removing the fastener 62 or 64 from brake lever 18.

In use, the handle end 48 of the brake lever 18 is attached to the safety belt of a workman or climber by means of a connecting ring or the like. The clamp appliance itself is mounted on a safety rope by removing pivot pin 20 to open the housing 12, which allows the side walls 14 and 16 to pivot about hinge assembly 24, and pivoting the brake lever 18 out of the way, thereafter the housing is placed on the rope and the pivot pin is inserted through the aperture 50 of side wall 14. When the pivot pin 20 is removed to open the housing, it need only be removed from side wall 14, not from both walls and the brake lever as in U.S. Pat. No. 4,253,218. With the actuating spring 30 installed for spring loading the clamp appliance 10, the clamp appliance is maintained in position on the rope against falling under its own weight by constant pressure against the rope by the brake surface 44 which in turn is under continuous torsioned pressure by the spring 60. As a person climbs a ladder or rocky cliff, the handle 48 of the brake lever 18 is pulled in an upward direction as shown by the arrow A in FIG. 5 where the movement of the brake lever as shown in phantom line. The upward pressure on the handle 48 relieves the pressure of the brake surface 44 against the rope 100, and permits the housing 12 to slide upwardly in the direction of arrow B of FIG. 5. The spring 30 exerts sufficient downward pressure on the handle 48 of the brake lever as to prevent the brake lever 18 from moving to its uppermost position with respect to the housinq 12. Instead, the brake lever is more easily pivoted out of engagement with the rope 100 which allows the housing to slide along the rope without any drag while mountain climbing or caving.

It will, of course, be understood that various changes may be made in the form, details, arrangements and proportions of the various parts without departing from the scope of the invention.

What is claimed is:

1. A safety clamp appliance, comprising:
   a housing having parallel first and second side walls and a U-shaped rear wall, said housing being longitudinally slidable on a safety rope;
   said U-shaped rear wall having a hinged means to pivot said first side wall to open said housing to remove a safety rope from said housing;
   said first side wall having a rope slide means perpendicular to said first side wall to guide a safety rope through said housing where said rope slide means is in said housing and above said hinge means of said U-shaped rear wall when said side walls are parallel;
   a brake lever means having a brake means end and a handle end with a pivot point intermediate said ends, an actuating spring connected at one end to said handle end and connected at the other end to said housing, where said brake lever means being pivoted by said actuating spring into constant engagement with the safety rope pressing the safety rope against the guide means;
   a disconnect means for disconnecting said actuating spring thereby changing said safety clamp appliance from being spring loaded to being non-spring loaded.

2. A safety clamp appliance as in claim 1 wherein said side walls are secured in the parallel position by a removable pivot pin, said brake lever pivot point being an orifice which pivots on said pin, where said pivot pin is removed from said first side wall to insert said safety rope.

3. A safety clamp appliance as in claim 2 wherein said side walls have stop means to limit the pivoting of said side walls to ninety degrees.

4. A safety clamp appliance as in claim 3 wherein said hinge means includes a first half having pivot knuckles on said first side wall and said second side wall having mating pivot knuckles with said knuckles on said first side wall, where said mating knuckles are held together by a hinge pin, said first side wall having said rope slide means, wherein said rope slide having a concave arcuate channel above said U-shaped rear wall forming one surface of said hinge knuckle half.

5. A safety clamp appliance as in claim 4 wherein said first and second side walls having skirt means covering said hinge means and providing said stop means to limit the pivoting of said side walls.

6. A safety clamp appliance as in claim 5 wherein said actuating spring is mounted in a mounting assembly having a cavity to receive said actuating spring, said mounting assembly having an orifice to receive said pivot pin and said cavity having a securing cavity to receive said second end of said actuating spring, said mounting assembly being mounted on said housing and where said mounting assembly aligns with pivot pin orifices in orifices said side wall.

7. A safety clamp appliance as in claim 6 wherein said disconnect means is a quick disconnect fastener.

8. A safety clamp appliance as in claim 7 wherein said actuating spring first end means to connect to said quick disconnect fastener is a coil which a fastener shaft passes through.

9. A safety clamp appliance as in claim 7 wherein said actuating spring second end means for securing to said housing is a coiled end for securing in said securing cavity of said mounting assembly.

* * * * *